US005452301A

United States Patent [19]

Klingman

[11] Patent Number: 5,452,301
[45] Date of Patent: Sep. 19, 1995

[54] DATA TRANSMISSION AND CONTROL SYSTEM USING LOCAL, EXTERNALLY GENERATED D, Q, AND M BITS IN X.25 PACKETS

[76] Inventor: Edwin E. Klingman, 3000 Highway 84, San Gregorio, Calif. 94074

[21] Appl. No.: 233,118

[22] Filed: Apr. 26, 1994

[51] Int. Cl.⁶ .............................................. H04J 3/16
[52] U.S. Cl. ...................................... 370/79; 370/60; 370/94.1; 370/110.1
[58] Field of Search .................. 370/79, 110.1, 94.1, 370/60, 112, 58.1, 58.2

[56] References Cited

U.S. PATENT DOCUMENTS

| | | | |
|---|---|---|---|
| 5,012,470 | 4/1991 | Shobu et al. | 370/94.1 |
| 5,027,343 | 6/1991 | Chan et al. | 370/94.1 |
| 5,060,229 | 10/1991 | Tyrrell et al. | 370/110.1 |
| 5,062,108 | 10/1991 | Bales et al. | 370/110.1 |
| 5,134,614 | 7/1992 | Baydar et al. | 370/110.1 |
| 5,271,010 | 12/1993 | Miyake et al. | 370/79 |

*Primary Examiner*—Douglas W. Olms
*Assistant Examiner*—Shick Hom
*Attorney, Agent, or Firm*—Claude A. S. Hamrick

[57] ABSTRACT

A data transmission and control system using local, externally generated D, Q, M bits in X.25 packets, and including a controller, a controlled device and a transceiver module at each of a plurality of locations. The controller at each location generates and delivers user controlled D, Q and M bits on separate lines and other data on an input/output data bus to the transceiver. The transceiver receives the Q, D, M bits and other data and assembles the data bits with other standard organizational bits to form X.25 information packets according to X.25 protocol. An ISDN interface then inserts the X.25 information packets in standard 48 bit frames for transmission over the ISDN network. The D, Q, M bits and other data are then received at a remote location where the process is reversed, the transceiver receiving the X.25 information packets, extracting the D, Q, M bits and applying them to separate terminals, and extracting the other data and applying it to an input/output data bus, all of which are delivered to a controller. The controller then responds to the D, Q, M bits and other data to act upon the controlled device. The apparatus at any one of the locations can communicate with apparatus at any of the other locations in a similar manner.

14 Claims, 9 Drawing Sheets

| BLOCK NO. | INSTRUCTION | DESCRIPTION |
|---|---|---|
| 230 | SETB RAM_ENABLE | ; DESELECT THE RAM 152 |
|  | CLR ISDN_ENABLE | ; SELECT ISDN INTERFACE 88 |
| 232 | MOV R1,#ISDN_FIFO | ; SETUP ADDRESS OF FIFO 188 |
|  | MOVX A,@R1 | ; READ DATA FROM FIFO 188 |
| 236 | JB X25_D_BIT,SET_D_BIT | ; BLOCK 236 |
| 248 | CLR D_BIT; |  |
|  | JMP TEST_Q | ; GO TO BLOCK 238 |
|  | SET_D_BIT: |  |
| 242 | SETB D_BIT | ; BLOCK 242 |
|  | TEST_Q: |  |
| 238 | JB X25_Q_BIT,SET_Q_BIT | ; BLOCK 238 |

Fig. 8

DATA TRANSMISSION AND CONTROL SYSTEM USING LOCAL, EXTERNALLY GENERATED D, Q, AND M BITS IN X.25 PACKETS

BACKGROUND OF THE INVENTION

1. Field of the Invention

The present invention relates to data transmission and control systems for use in Integrated Services Digital Networks (ISDN), and more particularly to a data transmission and control system wherein D, Q, and M bits are locally and externally generated for inspection in X.25 information packets and transmitted to a location where they are separated out and used for user-selected control purposes.

2. Description of the Prior Art

Digital information is transmitted throughout an ISDN system in a serial manner with organizational bits inserted in the data stream for control functions. For example, in the telephone system a type of connection referred to as the Basic Rate Interface transmits data in 48 bit segments called frames containing two B channels (B1 and B2) and one D channel, each B channel functioning effectively at 64 kbps and the D channel at 16 kbps. The basic organization of the B and D channels is illustrated in simplified form in FIG. 1 showing the two B channel allocations separated by D channel allocations. The channels are sequences of dedicated bits in the serial bit stream with organizational bits (not shown) setting them apart from each other. A larger number of bits is allocated to the B channels to allow their use for high data rate requirements such as voice communication. The D channel of lower capacity is used primarily for set up and other intermittent data transmission purposes. Each B channel allocation contains 8 bits for data and each D channel allocation contains one data bit.

FIGS. 1B and 1C show the organization of the bits making up a D channel frame, the bits actually being distributed over a number of the frame sequences of FIG. 1A, the lines 10 indicating that each bit of the bit stream of FIGS. 1B and 1C is really one of a series of separated bits in the complete data stream of FIG. 1A. Information sent in the D channel is preceded by a standard Flag at position or field 12 followed by an Address field 14 and Control field 16. The Information field 18 is normally 128 bits maximum, followed by a Checksum field 20 and concluded with a Flag field 22. The bits included in the Information Field 18 are referred to as layer 3 and are further detailed in FIG. 1C. There is a General Format Identifier field (GFI) 24 including a Q bit 26 and D bit 28. This D bit is not to be confused with the use of the letter D for D channel as related to FIG. 1A where every D channel bit is designated by the letter D. The D bit 28 is a separate and distinct one of the D channel bits and reference to the D bit in the following refers to this D bit 28 specifically. Although it may be somewhat confusing, the terminology is standard in the art. The GFI field 24 is followed by a Logical Channel Number (LCN) field 30 identifying the Data Terminal Equipment relative to the ISDN network at each end of the communication path. The Packet Type field 32 keeps record of the number of packets sent and packets received (not shown), and contains the M bit 34. This is followed by the Data field 36.

The bits of FIGS. 1A, 1B, 1C are arranged according to a standard format defined under rules known as X.25 protocol. The X.25 protocol was designed to accommodate ISDN systems as shown in FIG. 2 containing asynchronous terminals such as 38 and 39. In order to connect the asynchronous terminals 38 and 39 to a synchronous packet switched network including nodes 48 and links 50, a device called a PAD 52 (packet assembler-disassembler) is required. Physically, the PAD 52 can be part of the network 42, or it can be a privately owned device as illustrated at 54. FIG. 2 shows asynchronous terminals 38 connected to a public network 40 and then to an ISDN packet switched data network 42, and terminal 39 connected through a PAD 54 and an X.25 access line 44 to the packet switched data network 42. The figure also shows a data terminal 46 with the built in capability of assembling and disassembling X.25 packets, and in such a case if an X.25 access line 44 is available, a direct connection can be made to the nodes 48 of the packet switching network 42.

The data links 44 connecting to the nodes 48 are called X.25 access links and are governed by the organizational structure defined in X.25 protocol. The PADs 52 and 54 perform the X.25 protocol functions that the asynchronous terminals 38 and 39 cannot manage by themselves. A set of rules called Recommendation X.29 describes the control messages which are sent between the PAD 52 and the terminal 38. The PAD 52 must distinguish between messages that are for terminal to PAD operation and those that contain user information to be sent through the nodes 48 and links 50 over the ISDN network 42. The Q bit 26 shown in FIG. 1C provides for communication between a PAD 52 and a terminal 38. When the Q bit is set at Q=1 the PAD is notified that the data in Data field 36 is meant for the PAD, and a Q=0 communicates that the data 36 is meant to be transmitted over the ISDN network 42.

In the case of the synchronous terminal 46, the Q bit is not needed, because the organization is all under direct user control. This represents a waste of bit space which could be used for some purpose if equipment to accomplish it were available. A further disadvantage with the prior art is that such a data terminal would be rather expensive and therefore limited to applications where considerable data communication is required.

SUMMARY OF THE INVENTION

It is therefore an object of the present invention to provide a compact, low cost synchronous D channel ISDN transmitter that inserts externally generated D, Q and M bits for user selected purposes.

It is a further object of the present invention to provide a compact, low cost synchronous D channel ISDN receiver that separates out the D, Q and M bits for user selected purposes.

It is another object of the present invention to provide a compact, low cost synchronous D channel ISDN transceiver that separates out the D, Q and M bits for user selected purposes.

It is a still further object of the present invention to provide a D channel ISDN communications system that provides for user control over the D, Q and M bits, further providing enhanced flexibility and data handling capacity due to the use of the Q bit for user selected purposes.

Briefly, a preferred embodiment of the present invention includes a communications system operating on the standard ISDN D channel having apparatus including a controller, a controlled device and a transceiver module at each of a plurality of locations. The controller at each location generates and delivers user controlled D, Q and M bits on separate lines and other data on an input-/output data bus to the transceiver. The transceiver receives the Q, D, M bits and other data and assembles the data bits with other standard organizational bits to form X.25 information packets according to X.25 protocol. An ISDN interface then inserts the X.25 information packets in standard 48 bit frames for transmission over the ISDN network. The D, Q, M bits and other data are then received at a remote location where the process is reversed, the transceiver receiving the X.25 information packets, extracting the D, Q, M bits and applying them to separate terminals, and extracting the other data and applying it to an input/output data bus, all of which are delivered to a controller. The controller then responds to the D, Q, M bits and other data to act upon the controlled device. The apparatus at any one of the locations can communicate with apparatus at any of the other locations in a similar manner.

An advantage of the present invention is the provision of a special purpose device for use in the ISDN system replacing more expensive general purpose computer systems for specific information transmission.

A further advantage of the present invention is the provision of terminals and associated connections within a transceiver allowing user control over the Q, D and M bits and the use of the otherwise unused Q bit as an additional data bit in fully synchronous ISDN systems.

IN THE DRAWING

Figure 5:
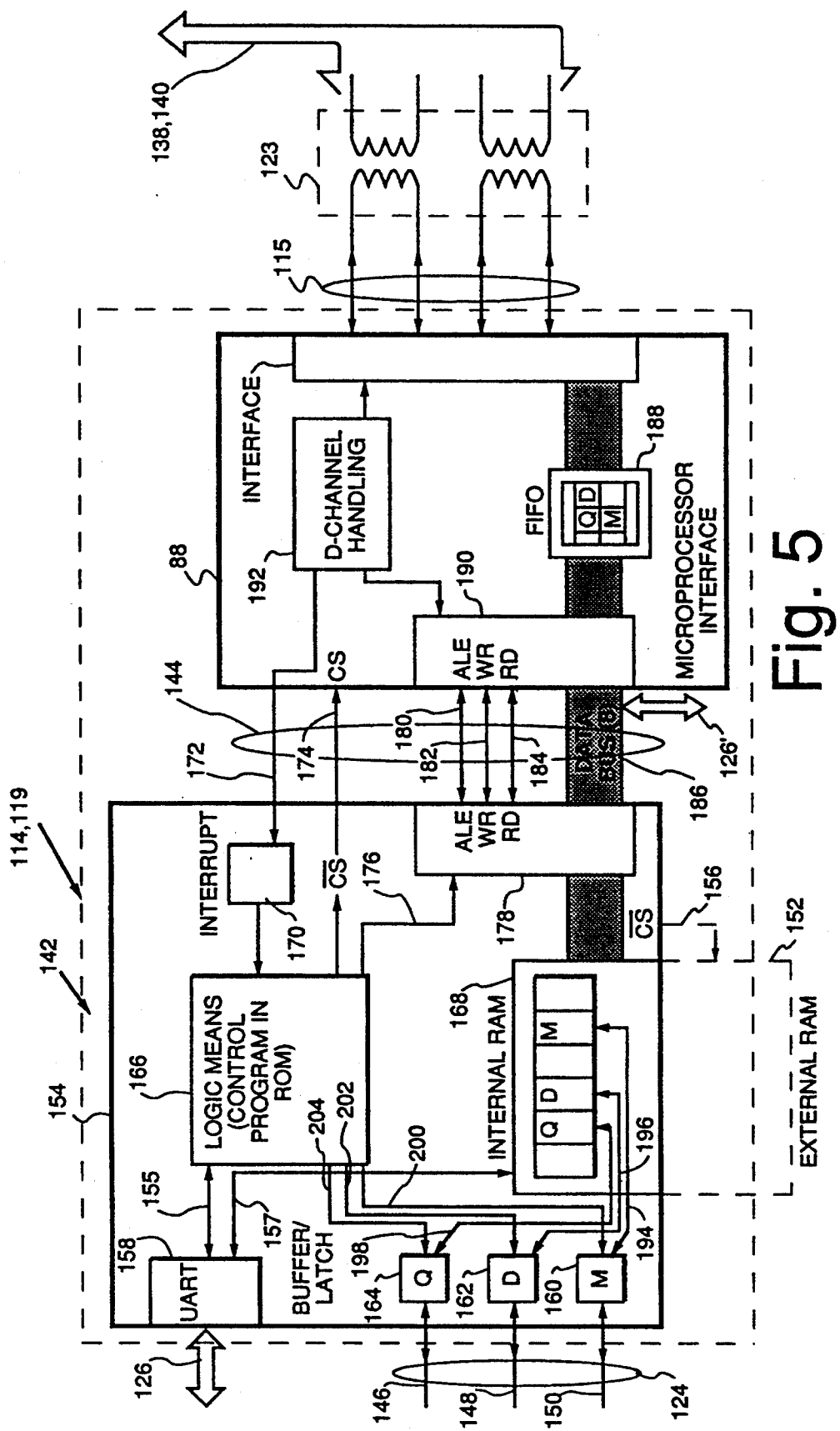
Figure 6:
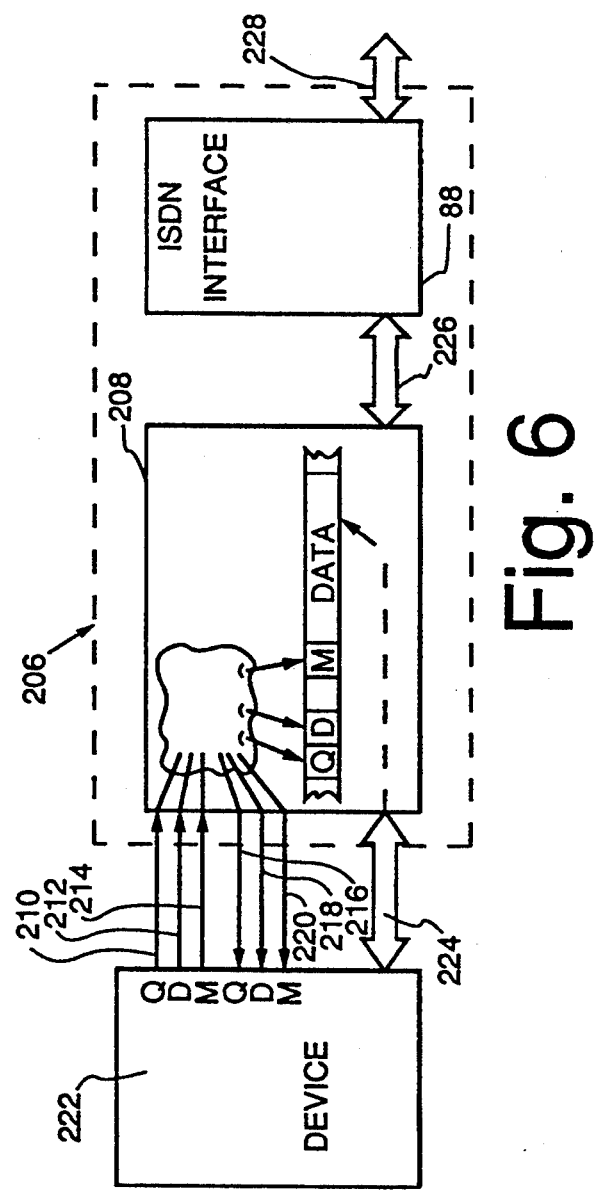
Figure 7:
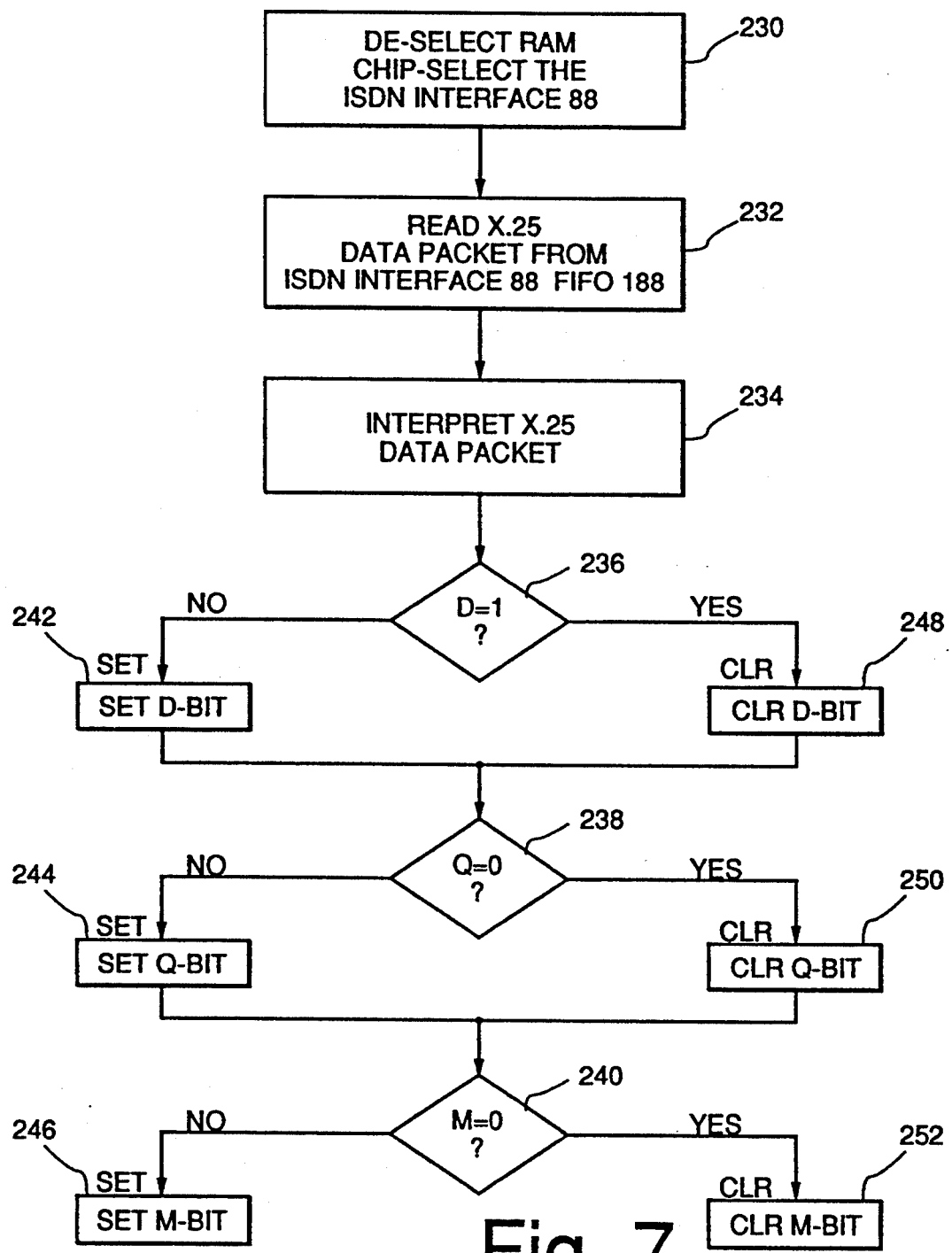
Figure 9:
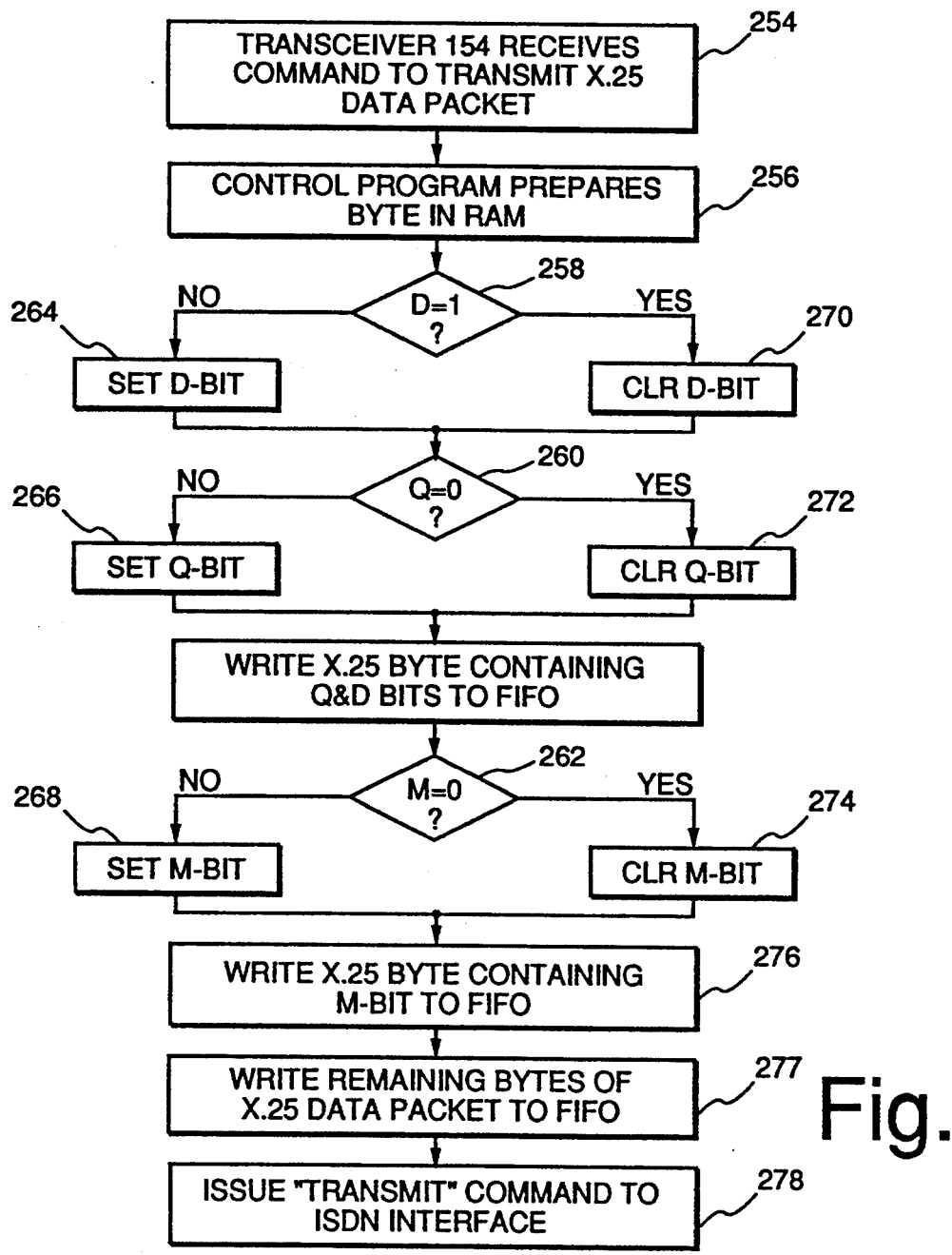

FIG. 5 gives further detail of the transceiver module, including a microcontroller/transceiver and an ISDN interface;

FIG. 6 shows a transceiver with a separate input and output for each of the D, Q and M bits;

FIG. 7 is a flow chart indicating the programming for the reception of the D, Q and M bits from the ISDN network and their distribution to separate terminals;

FIG. 8 is a list of example programming steps for the microcontroller/transceiver;

FIG. 9 is a flow chart indicating the programming for the reception of the D, Q and M bits from a source device through separate terminals.

DETAILED DESCRIPTION OF THE PREFERRED EMBODIMENT

Figure 3:
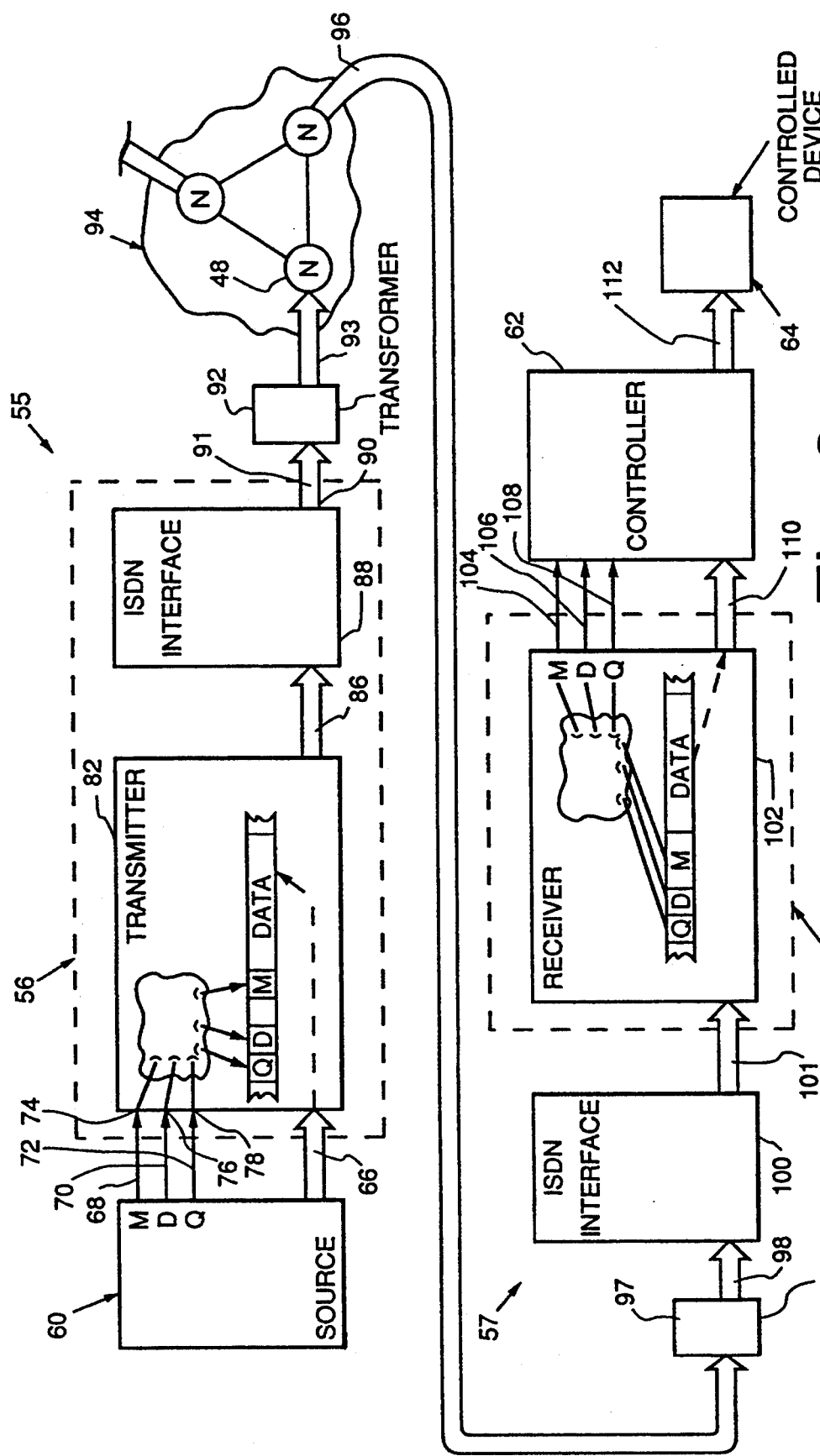
FIG. 3 shows an embodiment of the present invention as used in the ISDN network including a transmitter and receiver combination for controlling a device.

Referring now to FIG. 3 of the drawing there is shown an embodiment of the present invention including a transmitter-source unit 55 wherein a transmitting block 56 is used to transfer control signals from a source device 60 through an ISDN network 94 to a receiver-controller unit 57 including a receiving block 58 and a controller 62 for directing a controlled device 64. The source device 60 supplies first, second and third binary signals as Q, M and D bit data through lines 68, 70 and 72, and other binary information signal data through bus 66 to transmitter 82, which puts the D, Q, M bits and other data in an X.25 information packet and outputs the packet through bus 86 to an ISDN interface 88 such as the Siemens 2085 which takes the X.25 information packet and places it in a standard 48 bit frame for transmission through an ISDN network. The input terminals 74, 76 and 78 of transmitter 82 are provided for input/output of the M, D and Q bits and are a novel feature of the invention not found in the prior art. The ISDN interface 88 outputs 48 bit frames through bus 91 to transformer 92, in turn passing the frames through bus 93 to ISDN network 94 which is shown interconnecting with a bus 96 leading to transformer 97 to bus 98 to an ISDN interface 100 which strips off the X.25 information packet and outputs it through bus 101 to a receiver 102 which extracts the D, Q, M bits and other data from the X.25 information packet and outputs the D, Q, M bits through terminals 104, 106 and 108, and the other data through bus 110 to the controller 62. The controller 62 in turn is responsive to the D, Q and M bits and other data to output control signals through bus 112 to the controlled device 64.

More specifically, the present invention provides a novel use of the Q bit, the value of which is selected and applied by a user through line 72 and received by the transmitter 82, inserted into 8 bit blocks of data in the proper order according to X.25 protocol to form X.25 information packets, and outputted through bus 86 to ISDN interface 88 which in turn supplies the necessary structure and organization for transmitting the X.25 information packets in standard 48 bit frames over the D channel of the ISDN network. The 48 bit frames containing bits in serial arrangement, are passed through bus 91, transformer 92, and bus 93 to the ISDN network 94, and via bus 96 to transformer 97 and through bus 98 to ISDN interface 100 of the receiver block 58, which extracts the X.25 information packets as in FIG. 1C and inputs the data bits in 8 bit blocks including the Q, M and D bits and other data to the receiver 102 which separates out the Q, D and M bits and outputs them on terminals 108, 106 and 104 respectively and the other data through bus 110, all to the controller 62 which interprets the data, including Q, D, and M bits and responds by applying corresponding control signals to the controlled device 64. The Q bit is, again, of particular usefulness due to its availability as an additional data bit for special control or data flow purposes since it is not needed in a system that does not require a PAD (packet assembler-disassembler).

Figure 4:
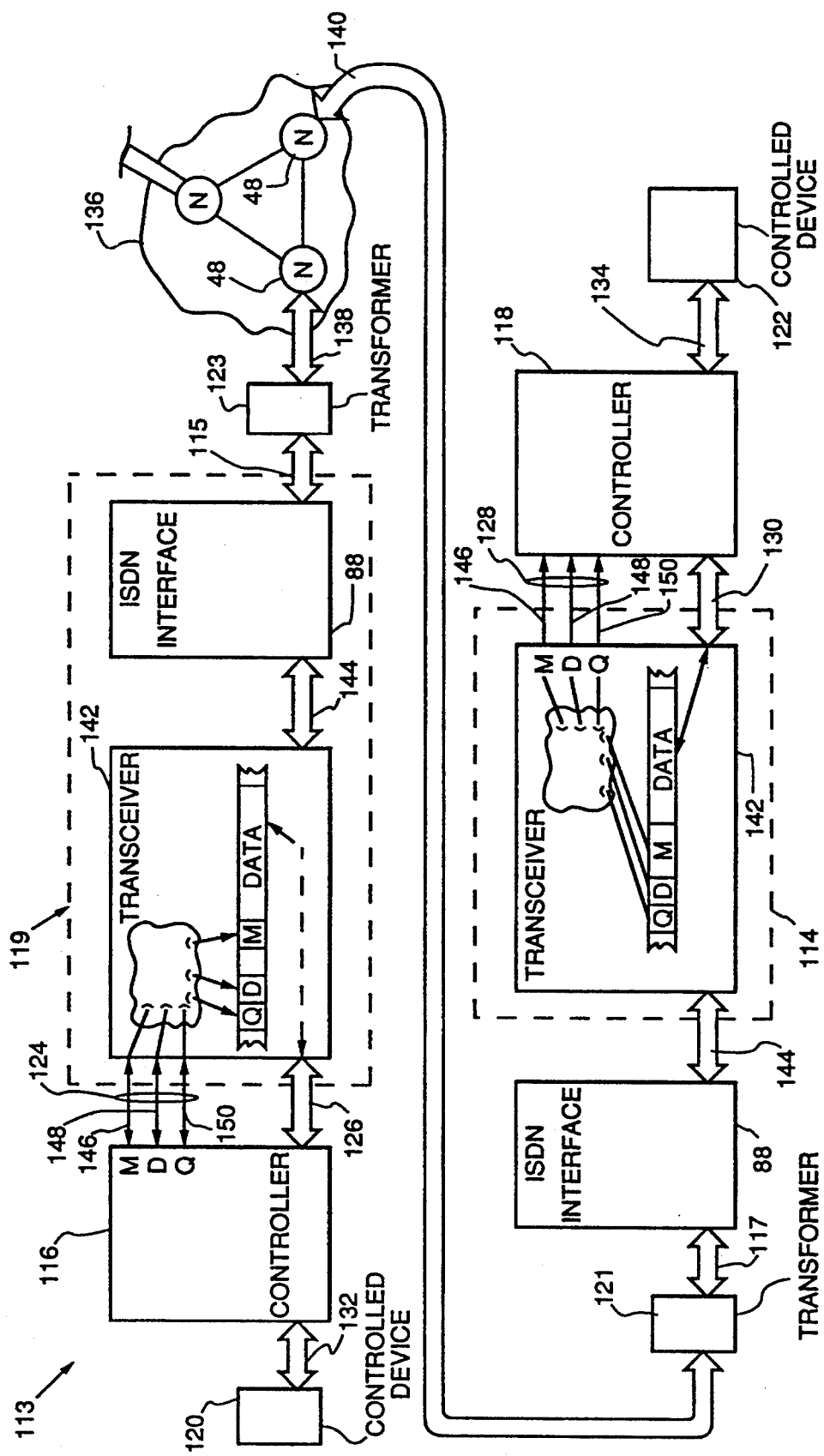
FIG. 4 shows an embodiment of the present invention as used in the ISDN system including transceivers at both ends of the ISDN network for controlling devices.

FIG. 4 shows an embodiment of the present invention with transceiver-control systems 113 and 115 at two ends of an ISDN including transceiver modules 119 and 114 for transmission of data in both directions from controllers 116, 118 and/or controlled devices 120, 122 which can be for any of a wide variety of purposes. The controller 116, for example, can send a first set of binary signals to controller 118 and receive a second set of binary signals from controller 118 causing data to be sent and received from and to the transceiver modules 119 and 114 via bus lines 124, 126, 128 and 130, and also to and from the controlled devices 120 and 122 via bus lines 132 and 134 as required by the particular application. The transceiver modules 119 and 114 transmit and receive properly framed communication data to and from each other via bus lines 115, 117 and transformers 123, 121 and through ISDN network 136 via bus lines 138 and 140.

Each transceiver module 119 and 114 has a transceiver/microcontroller 142 and an ISDN interface 88 joined by a bus line 144. The transceiver modules 119 and 114 are identical, but are given the different numbers 119 and 114 to distinguish one end of the network from the other for descriptive purposes.

The transceiver/microcontrollers 142 are a special adaptation of a microcontroller such as the Intel 8051 for receiving data from a source device such as controllers 116, 118 and for processing it for input to an ISDN interface 88, or in the reverse direction, for receiving X.25 information packets from the ISDN interface 88 and extracting the D, Q and M bits and other data and delivering it to the controller. The transceiver/microcontroller 142 is configured in a novel way to have separately accessed terminals 146, 148, 150 for supplying or receiving the M, D and Q bits to or from the controllers 116, 118 shown via bus lines 124 and 128 respectively.

Figure 2:
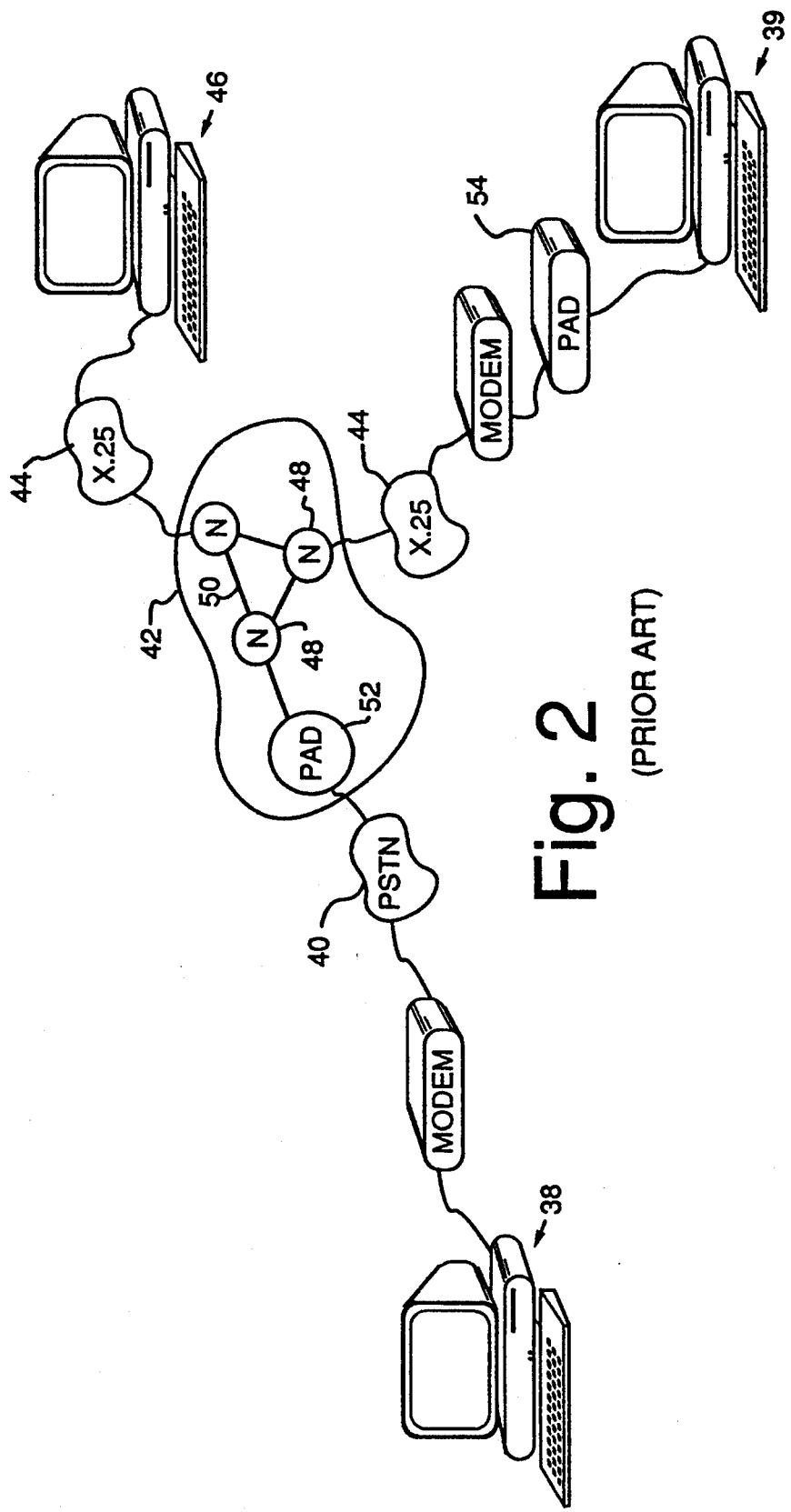
FIG. 2 shows a prior art system illustrating three methods used to access the ISDN/X.25 network.

The sequence of operations in the system of FIG. 3 is similar to that of FIG. 4 except for the completely 2 way communication of the transceiver embodiment of FIG. 4, so the following more detailed description applies to either of the figures. The communication begins with a controller 116, 118, 60 originating binary signals representing M, D, Q bits and other binary information data signals, some of which may be in response to input from controlled devices 120, 122. The M bit is used to indicate whether or not more data is to be sent. The D bit is used to indicate to the system what kind of confirmation is desired regarding the reception of bits. Bit reception can be confirmed at the local level (Node to Transceiver Module) or at the destination level (Transceiver to Transceiver). This use of the M and D bits is standard in the art, but the separate reception or generation of them by a controller 60, 116, 118 and the apparatus to insert them through independent terminals to a microcontroller is novel. The selection and use of the Q bit as an additional data bit is particularly useful, as shown in the systems of FIGS. 3 and 4 for special control or data transfer purposes. The Q bit is a data bit set aside by prior art X.25 protocol for directing communication to a PAD (packet assembler-disassembler). In a prior art system as illustrated in FIG. 2, the Q bit is needed to selectively direct dedicated communication for coordination functions between a PAD and terminal (such as 52 and 38) through the PSTN 40 network, or to direct data intended for transfer to a remote terminal 39 through the network 42.

In modern synchronous systems not requiring PADs, the Q bit is currently wasted, being unused in the totally synchronous system, buried in the X.25 packet frame and unavailable for any purpose. The present invention involves apparatus for extracting and injecting the Q bit from and to the microcontroller for use in enhancing the quantity of data that can be transferred over the ISDN D channel.

Figure 1:
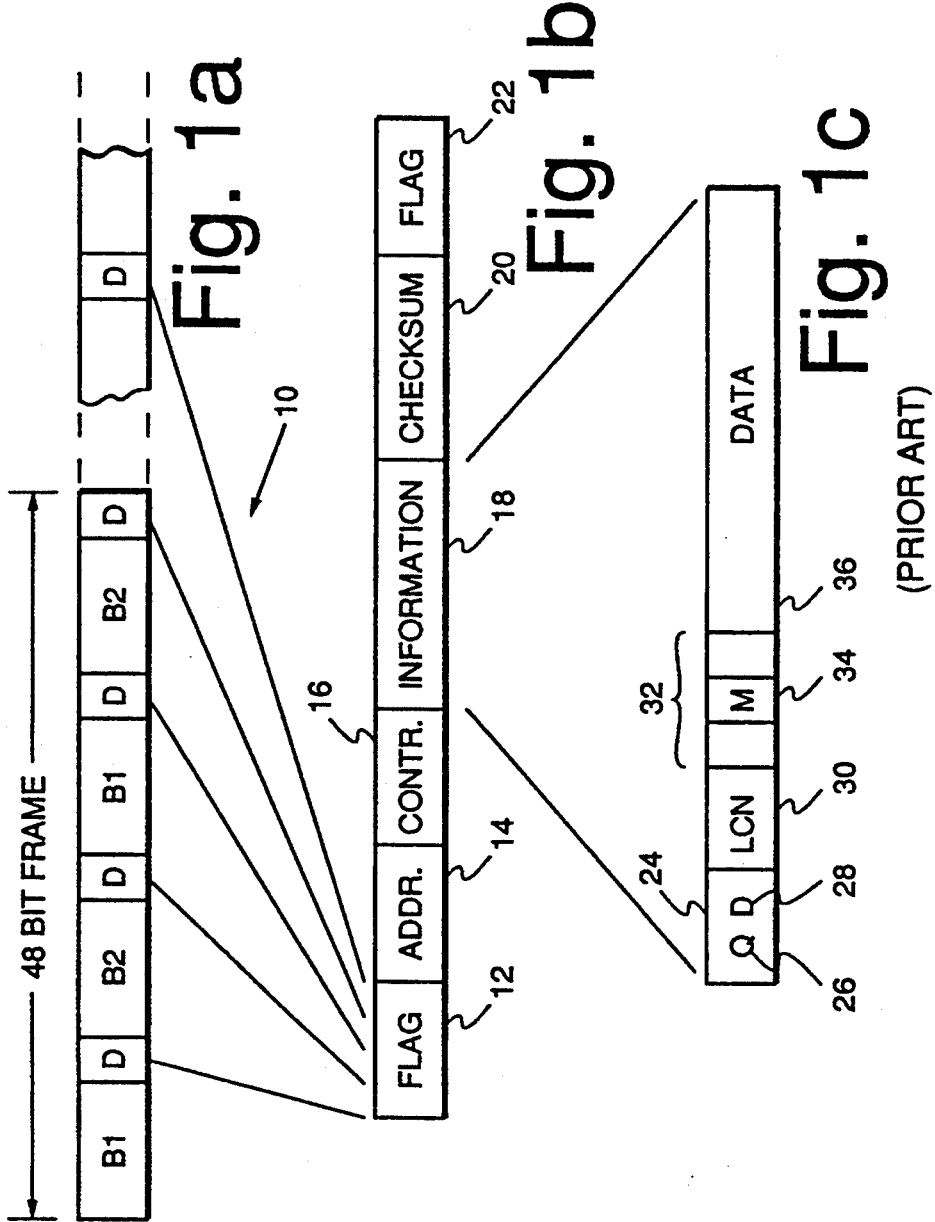
FIG. 1A is an illustration of the order of transmission of B and D channel information in ISDN systems.
FIG. 1B shows the organization of the bits making up the D channel packet.
FIG. 1C shows further detail of the layer three X.25 information packet or Information field of the D channel packet of FIG. 1B.

Now, providing further description of the operation of the systems in a step by step manner, a source device 60, 116, 118 is caused to assert an M bit via TTL (preferred) ASCII (preferred) control characters via lines 68, 146 to the transmitter 82 (FIG. 3) or transceiver 142 (FIG. 4), depending on which figure is being referred to. Similarly, the source device 60, 116, 118 is caused to assert the D and Q bits via lines 70, 72 or 148, 150 to the transmitter 82 (FIG. 3) or transceiver 142 (FIG. 4), and other data via bus lines 66 (FIG. 3), or 126, 130 (FIG. 4). The transmitter 82 or transceiver 142 places the D, Q, M bits and other data in the proper order for an X.25 information packet along with other standard layer 3 organizational bits well known in the art and as briefly summarized in the description of FIG. 1C. These layer 3 bits or i.e. X.25 information packets are then delivered in 8 bit parallel blocks via bus line 86, 144 to the ISDN interface 88 which inserts them into the organizational data frame of FIG. 1B and into standard 48 bit serial 2B+D frames summarily indicated in FIG. 1A, the details of which are well known in the art. These standard 48 bit serial data frames are then passed over bus line 91, 115, 117 and through transformer 92, 119, 121 and bus line 93 (FIG. 3) and 138, 140 FIG. 4 to a node 48 within the ISDN network 94 or 136. The protocol governing the transmission of the X.25 information packets such as from a transceiver to a node is called X.25, and the data frame containing the D channel data as shown in FIG. 1C is known as an X.25 information packet. These packets are sent by transmitter module 56 in the standard 48 bit frames through the ISDN network 94 to receiver module 58 as in FIG. 3, or from one transceiver 119 to another transceiver 114 or vice versa through ISDN network 136 as in FIG. 4.

At the receiving end of the network, either the receiver 58 of FIG. 3 or the receiving transceiver of FIG. 4 (119 or 114 depending on which one originates the data), extracts the D, Q, M bits and other data from the X.25 packet and delivers the D, Q and M bits to the corresponding terminals 106, 104, 108 (FIG. 3) or 146, 148 or 150 of FIG. 4, and the other data through bus 110, 126, 130 to the corresponding controller 60, 116, 118. The controller 60, 116, 118 then uses the Q bit and other data for definition or direction of data flow to the controlled device 64, 120 and 122 via line 112, 132, 134.

The transceiver configuration of FIG. 4 has the capability of transmitting and receiving data simultaneously, the input/output lines such as 124, 126, 144 and 115, etc. of the microcontroller 142 and ISDN interface 88 being bi-directional.

The single set of terminals 146–150 of FIG. 4 requires the incoming and outgoing data between the transceiver 142 and device 116 to time share the transceiver 142 in order to avoid collisions. One type of time sharing is a "ping pong" operation of X.25 packets, wherein the transmitted and received packets never collide since each is the precursor of the other. For example, consider an application where a motor controller receives a position query from a base terminal and then generates a position response before the base terminal generates the next packet to the motor controller. In further example, a server may issue a "menu" to a remote keyboard/display device, which in response receives the menu and then transmits a key message to the server describing a selection from the menu. The server waits for the Key before issuing the next message (usually another menu) and the keyboard display waits for menus before issuing keys. In these and similar cases there should never be collisions of X.25 packets, and no timing analysis is necessary with the D, Q and M signal lines always having the correct function. Alternatively to time sharing, two sets of terminals, one for outgoing and another for incoming signals can be implemented. This aspect of the invention will be more fully explained in reference to FIG. 6.

FIGS. 3 and 4 are given by way of illustration of particular embodiments. Although only two transceivers and associated apparatus in two locations are shown in FIGS. 3 and 4, the spirit of the invention also includes any number, at any number of locations.

FIG. 5 gives further details of the transceiver modules 119, 114 of FIG. 4, which details also apply in part to transmitter 56 or receiver 58 of FIG. 3 where only uni-directional communication is required. For ease of illustration, only FIG. 4 item numbers for the system at one end including transceiver 119 will be used for the most part. The description applies to the system at the other end as well, since the transceivers 119 and 114, and transformers 123 and 121 can be identical. The controllers 116, 118 and controlled devices 120, 122 could all be different, but they are identical as far as their method of interaction with the system is concerned in the separate selection and delivery of the D, Q and M bits.

The microcontroller/transceiver 142 is shown with interconnections to the ISDN interface 88, which in turn is shown interconnected through bus 115 to the transformer 123 for receiving and sending data through bus line 138 to the ISDN network 136. The transceiver 142 normally includes an external RAM 152 attached to a microcontroller 154 such as the Intel 8051. The RAM 152 is usually necessary because the 8051 microcontroller 154 does not normally have enough internal RAM for practical applications. The spirit of the invention would include integrated assemblies such as a microcontroller with adequate memory for a particular application. The chip select interconnection 156 is for enabling the external RAM 152 when appropriate.

The microcontroller 154 is shown to receive data inputs via bus 126 to a first microcontroller interface which is a universal asynchronous receiver transmitter (UART) 158. The UART is connected to communication lines 155 and 157 to a logic means 166, having a control program in a ROM, and to the RAM 168 or RAM 152. As shown, the input to UART 158 is a serial input. Alternatively, if the data arriving from a device such as controller 116 is in parallel form, the bus 126 as shown in FIG. 4 could actually be inputted to the transceiver 154 via bus 186 of FIG. 5 to a second interface 178 that processes the data in parallel form, the ISDN interface 88 and device 116 sharing the bus 186. This is symbolically shown in FIG. 5 by the dashed bus line 126'. With this alternative shared data path from controller 116 to transceiver 154, an additional chip select line is necessary to select controller 116 for data transfers while at the same time disabling ISDN interface 88 via chip select number 174 and disabling external RAM if present via line 156. In all cases of shared bus access the transceiver 154 is responsible for selecting (enabling) the appropriate device after deselecting (disabling) all inappropriate devices, thereby time-multiplexing the shared resources.

The M, D and Q inputs are shown to communicate via bus 124 to buffer/latches 160, 162 and 164 respectively. In an alternate embodiment, the transceiver 154 can also be programmed to receive the D, Q and M bits by way of bus 126. The buffer/latches 160–164 are interconnected to the logic means 166, and to an internal RAM 168 or alternatively to external RAM 152 used to hold D, Q, M data as well as other operating variables and parameters. The logic means 166 contains a Program Control Code that is the master program coordinating all subsystems, the use of the word subsystems meaning all of the operational elements/aspects of the microcontroller 154. This code controls all RAM, all input/outputs and other internal subsystems, as well as issuing commands to the ISDN interface 88 and reading and writing data from and to the interface 88 using bus 144. The logic means 166 is interconnected to a standard Interrupt Circuit 170, in turn connected to the ISDN interface 88 via line 172 to allow the ISDN interface 88 to inform the microcontroller 154 that the interface 88 has received data for the microcontroller or is ready to accept data (or other information such as error messages) from the microcontroller 154. The interrupt circuitry 170 for the 8051 is standard and is described in 8051 documentation. It operates to interrupt the operation of the logic means 166 control program whenever required for any higher priority operation. The interrupt 170 causes the control program to save any current program data in memory and branch to an interrupt handling portion of the control program.

The logic means 166 also has a chip select line 174 interconnecting with and for enabling the ISDN interface device 88. A line 176 leads from the logic means 166 to interface 178 having interconnections 180, 182 and 184 to the ISDN interface device 88. The Address Latch Enable (ALE) line 180 is standard and supported by both the microcontroller 154 and ISDN interface device 88. The Write (WR) line 182 is also standard and used to write data from the microcontroller 154 to the ISDN interface 88. The Read (RD) line 184 is used to read data from the ISDN interface 88 to the microcontroller 154.

Referring again to the buffer/latches 160–164 for handling of the D, Q and M bits, the Q bit buffer/latch 164 is used to interface the transceiver 142 to the controller 116 (FIG. 4). See also 118 (FIG. 4) and 60 and 62 (FIG. 3). Signals from the controller 116 to the buffer 164 are read by the microcontroller 154 and copied into the X.25 packet before being sent over the data bus 186 to the interface 88 for transmission over the ISDN network 136. Similarly, Q bits arriving in X.25 packets from the ISDN network are read from the ISDN interface 88 FIFO (first-in first-out) 188 into the transceiver 142 RAM 168 or 152, and the received Q bit is made available to the controller 116 via line 146 from buffer/latch 164. It should be noted that the bi-directional buffer/latches 160–164 are a standard feature of the Intel 8051 microcontroller, and allow a single input/output pin to be used for either input or output, as desired. The handling of the D and M bits is done in exactly the same way as in the above description for the Q bit.

The microcontroller interface 178 is the standard interface used in the Intel 8051 microcontroller and consists of the Address Latch Enable (ALE) 180, the Write line (WR) 182, the Read line (RD) 184, and the data bus 186. The electrical levels and timing information are all available in Intel 8051 design documentation as well as in documentation from other manufacturers of equivalent products.

The interface 190 of the ISDN interface 88 is the compliment of the 8051 interface 178, and is designed to match the 8051.

Referring now specifically to the ISDN interface 88, the D channel handling subsystem 192 extracts the D channel bits from 48 bit ISDN Basic Rate frames incoming via bus 138 and accumulates them in the FIFO 188 where they are available to the microcontroller 154 via the data bus 186. For outgoing X.25 packets to bus 138, the microcontroller 154 writes the X.25 packets (both header and data) into the FIFO 188, and the D channel handling subsystem 192 extracts the bits from the FIFO and inserts them into the 48 bit ISDN Basic Rate frame that is passed to the network 136 via bus line 138. This subsystem 192 also handles "FLAG" insertion and detection.

Considering the FIFO 188 in further detail, it consists of a double-buffered Receive FIFO and a double buffered Transmit FIFO (not shown). The incoming X.25 packets accumulate in the Receive FIFO where they can be read by the microcontroller 154 via the data bus 186. The microcontroller 154 writes outgoing packets into the Transmit FIFO where they are extracted and inserted into the 48 bit frame. The description of the ISDN interface 88 is standard knowledge and can be obtained in full detail from the manufacturers data, such as the ISDN interface manufactured by Siemens denoted as Subscriber Access Controller 2085.

The ISDN interface 88 couples to the transformer 119, which in turn is connected to a network termination (not shown) coupling to the bus 138 to the ISDN network 136. The 48 bit frames pass across transformer 119 in both directions (full duplex).

In brief summary of the operation of the microcontroller 154, it receives for example, a first set of binary signals on lines 146-150 including a first binary signal representing a Q bit on line 146, a second binary signal representing a D bit on line 148 and a third binary signal representing an M bit on line 150 and a plurality of binary information signals on bus line 126. The bus lines 126 and 124 are bi-directional allowing the flow of information in and out of the microcontroller 154. The first, second and third binary signals are received and latched by buffer/latches 160-164 and the binary information signals are received by UART 158. The signals in bus line 126 are in serial form to UART. Alternately, signals in parallel form can be received through an alternate bus line 126' by time sharing of the interface 178 as previously explained. The logic means 166 control program then directs the signals in buffer/latches 160-164 and in UART 158 or interface 178 to be entered into RAM 168 or 152. The logic means 166 then outputs the binary signals to the interface 178 in an order proscribed by X.25 protocol wherein the signals are interleaved with standard organizational bits in order to place them in what is known as an X.25 information packet. These signals and the added organization bits are then outputted by direction of the logic means 166 by the interface 178 for further processing by an ISDN interface 88 which places them in standard 48 bit data frames for transmission over an ISDN. The microcontroller 154 additionally may receive a second set of binary signals from a remote device transmitted through an ISDN network. These binary signals are first received by the ISDN interface 88 and the X.25 information packets are extracted from the 48 bit data frames and outputted by the microprocessor interface 190, whereupon they are received by the interface 178 and the logic means 166 then directs the signals in the interface 178 to be deposited in the RAM 168, from which the first binary signal representing the standard Q bit is extracted and placed in buffer latch 164, the D bit extracted from its position in RAM and placed in buffer/latch 162 and the M bit extracted from RAM and placed in buffer latch 160. The binary information signals are transferred to UART 158 or alternatively to a time shared interface 178. The buffer/latches and UART (or interface 178) are then directed by logic means 166 to output the signals to the bus lines 126 and 124 for use by a controller or like device. In this way the Q, M and D bits are placed under user control, and in particular the Q bit is made available as an additional data bit.

FIG. 6 shows a module 206 with a transceiver 208, similar to transceiver 142 of FIG. 4 except it has two sets of terminals 210-214 and 216-220 for the D, Q and M bits interconnected to a device 222 which may be any desired combination of controller and controlled device as in FIG. 4. Terminals 210-214 as shown are dedicated to data flowing from device 222 to transceiver 208, and terminals 216-220 are for data flowing from the transceiver 208 to the device 222. Since the transceiver module 206 can send and receive data at the same time, separate sets of D, Q and M terminals allow for efficient communication between the device and transceiver. This allows completely asynchronous, full duplex X.25 packet flow. For completeness of description, the figure also shows the ISDN interface 88 and data buses 224-228 serving similar purposes to the corresponding data buses 126, 144 and 115 of FIG. 4. The details of interconnecting the additional set of D, Q, M terminals to buffer/latches and the RAM and ROM are a straight forward expansion of the details shown in FIG. 5.

The procedures involved in the modification of the standard microcontroller such as the Intel 8051 for the purposes of the present invention will be well understood by those skilled in the microcontroller art after reading the detailed description herein. Although the input/output buffer/latches in the 8051 are standard, the invention involves the novel modification of connecting one or two sets of D, Q, M bits to terminals allowing user control. For example, the Q bit, or each of the Q, M and D bits, from the RAM 160 or 152 through lines 194-198 to input/output buffer/latches 160-164 and to the logic means 166 (through lines 200-204) for directing the buffer/latches to a buffer or latch state depending on whether the data is being received from the ISDN network via bus 186 for use in the controller 116, or whether the data is being received from the controller for transmission through the ISDN network 136.

FIG. 7 is a flow chart indicating the basic programming steps required for the transceiver to handle the incoming communication from the ISDN network and FIG. 8 illustrates the machine programming instructions corresponding to the steps of FIG. 7 through the handling of the D bit. The steps for the Q and M bits are similar and readily implemented by those skilled in the art. This program is required in addition to the circuit modifications involving the hookup of the M, D and Q bits to the terminals via the buffer/latches. Block 230 indicates that the data (from a controller such as 116) stored in RAM 168, 152 is deselected, and the ISDN interface 88 is selected through line 174. FIG. 8 shows that the programming instructions for block 230 are SETB RAM_ENABLE; which deselects the RAM 152, and CLR ISDN_ENABLE; which selects the ISDN interface 88. Block 232 involves reading X25 data from the ISDN interface 88 FIFO 188 and implements the instructions under block 232 in FIG. 8 including MOV R1,#ISDN_FIFO; which sets up an address for data from the FIFO 188 and MOVX A,@R1; which involves reading the data from the FIFO 188. What this does is set up the value of the ISDN_FIFO into an address in a register in the microcontroller 8051. The X.25 data are actually formed by several bytes and it is necessary therefore for the instruction MOVX A,@R1 to be repeated for each successive byte of data. Because these X.25 data packets contain data in a sequential order, their place in sequence determines their meaning, which is determined as indicated in block 234, which interprets the X.25 data packet. Each byte is interpreted as it is read from the FIFO 188 and held in the 8051 microcontroller. When the system reaches the D bit for example, its state can be determined as indicated in blocks 236, 242 and 248. The detection of the state of the D bit is indicated by block 236 and in FIG. 8 under block 236 by the instruction JB X25_D_BIT,-SET_D_BIT. JB is the 8051 microcontroller instruction for "jump if bit set" if the bit is set, which causes the operation to jump to block 242 in FIG. 7, also described in the instructions of FIG. 8 in the "block 242" line where the instruction SETB D_BIT; is given followed then by TEST_Q: after which a similar procedure is followed for the testing and handling of the Q bit, which general procedure is also used for the M bit as indicated in FIG. 7 by blocks 240, 246, and 252. In other words X25_D_BIT is the name that is being used to link the data with a table to determine which bit is being tested from a register that was just read from externally. The SET_D_BIT instruction is the name of the target to jump to if that bit was set, which in the example of the D bit was block 242 of FIG. 7. Now if the D bit were equal to one, instruction JB etc would result in a jump to the next line in FIG. 8 or block 248 in FIG. 7, which instruction is CLR D_BIT; after which the following instruction JMP TEST_Q would cause the system to jump to block 238 where a similar procedure would then be followed for the testing and processing of the Q bit, after which a similar process would be followed for the M bit.

FIG. 9 indicates the programming of the transceiver 154 for processing the D, Q and M bits inputted from a source device such as controller 116 for transmission through an ISDN network. Block 254 indicates that the transceiver has received a command to transmit an X25 data packet. Block 256 implies programming the logic means 166 to prepare the X25 packet byte that will contain the Q and D bits. The D, Q and M bits are read from buffers 160, 162 164 of FIG. 5. Decision blocks 258-262 represent the reading of these buffered terminals, and selection blocks 270-274 and 264-268 represent the setting or clearing of the appropriate D, Q, M bits in the data bytes according to the state of these buffered terminals. The data byte with the D and Q bits properly set is then written to the transmit FIFO in the ISDN interface 88. The data byte with the M bit properly set is then written to the transmit FIFO as shown in 276. The transceiver then accesses the data bytes from the controller 116 as shown in block 277 and writes these bytes into the transmit FIFO. Finally, a "transmit X25 packet" command is written to the ISDN interface 88 as shown in 278. The instructions for the operations of FIG. 9 are similar in character to those of FIG. 8 and will be readily implemented by those skilled in the art after reading the above disclosure.

The programming as illustrated relative to FIGS. 7, 8 and 9 is related to the special handling of the D, Q and M bits through the terminals 146-150. The overall programming of the transceiver 154 for processing X.25 information packets is well known to those skilled in the art and is available from Intel as related to their 8051 microcontroller. The programming steps are similar to those related above in reference to FIG. 7 and will be readily apparent to those skilled in the art.

Although a preferred embodiment of the present invention has been described above, it will be appreciated that certain alterations and modifications thereof will become apparent to those skilled in the art. It is therefore intended that the appended claims be interpreted as covering all such alterations and modifications as fall within the true spirit and scope of the invention.

What is claimed is:

1. A data transmission and remote control system using the Integrated Services Digital Network, ISDN, to communicate control information between remote locations, comprising:

a first control unit for disposition at a first location including
source means for generating first, second and third binary signals and a plurality of first binary information signals;
first microcontroller means including
first buffer/latch means for receiving and latching said first binary signal;
second buffer/latch means for receiving and latching said second binary signal;
third buffer/latch means for receiving and latching said third binary signal;
first microcontroller interface means for receiving said plurality of first binary information signals;
first RAM means;
second microcontroller interface means;
first logic means for transferring the first, second and third binary signals held in said first, second and third buffer/latch means and the first binary information signals from the first microcontroller interface means to said first RAM means for placement in a standard X.25 information packet according to X.25 protocol for transmission over said Integrated Services Digital Network, ISDN, with said first binary signal being inserted in the standard Q bit position, said second binary signal being inserted in the standard M bit position, said third binary signal being inserted in the standard D bit position, and said plurality of first binary information signals being inserted in standard information data positions, and for transferring said first, second and third binary signals and said first binary information signals from said first RAM means to said second microcontroller interface means in the order prescribed for said X.25 information packet; and
first ISDN interface means for placing the X.25 information packet including the first, second and third binary signals and the first binary information signals in standard 48 bit ISDN data frames for transmission through the ISDN to a remote second control unit wherein the Q bit is recognized and used as an additional data bit.

2. A data transmission and remote control system as recited in claim 1 and further comprising:
a second control unit for disposition at a second location including
second ISDN interface means for receiving said 48 bit data frames from the ISDN and extracting said X.25 information packet signals including the first, second and third binary signals and the binary information signals;
second microcontroller means including
second RAM means;

third microcontroller interface means for receiving the extracted X.25 information packet signals from said second ISDN interface and communicating them to said RAM means;
fourth buffer/latch means;
fifth buffer/latch means;
sixth buffer/latch means; and
fourth microcontroller interface means;
second logic means for transferring the first binary information signals from said second RAM means to said fourth microcontroller interface means, the first binary signal from said second RAM means to said fourth buffer/latch means, the second binary signal from said second RAM means to said fifth buffer/latch means, and the third binary signal from said second RAM means to said sixth buffer/latch means; and
first controller means coupled to said fourth, fifth and sixth buffer/latch means and said fourth microcontroller interface means, said first controller means being responsive to said first, second and third binary signals and to said first binary information signals and operative to control a first controlled device, whereby the Q, M and D bits are separately supplied from a source means and are transmitted through the ISDN, and the Q bit is recognized and used as an additional data bit.

3. A data transmission and remote control system as recited in claim 2 wherein
said first controller means is operative to generate fourth, fifth and sixth signals and a plurality of second binary information signals;
said fourth buffer/latch means includes means for receiving and latching said fourth binary signal;
said fifth buffer/latch means includes means for receiving and latching said fifth binary signal;
said sixth buffer/latch means includes means for receiving and latching said sixth binary signal; and
said fourth microcontroller interface means includes means for receiving said second binary information signals;
said second logic means transferring the fourth, fifth and sixth binary signals from said fourth, fifth and sixth buffer/latch means and the second binary information signals from the fourth microcontroller interface means to said second RAM means for placement in a standard X.25 information packet according to X.25 protocol for transmission over an ISDN, with said fourth binary signal being placed in the standard Q bit position, and said second binary signal being placed in the standard M bit position, said third binary signal being placed in the standard D bit position, and said plurality of second binary information signals being placed in standard information data positions; and for transferring said fourth, fifth and sixth binary signals and said second binary information signals from said second RAM means to said third microprocessor interface means in the order prescribed for said X.25 information packet for output of said fourth, fifth and sixth binary signals and said second binary information signals; and
said second ISDN interface means includes means for placing the X.25 information packet including the fourth, fifth and sixth binary signals and the second binary information signals in standard 48 bit ISDN data frames for transmission through the ISDN to said first control unit.

4. A data transmission and remote control system as recited in claim 3 wherein
said first ISDN interface means further includes means for receiving 48 bit ISDN data frames and for extracting and outputting X.25 information packets including said fourth, fifth and sixth binary signals and said second binary information signals;
said second microcontroller interface means includes means for receiving said X.25 information packets and inserting said fourth, fifth and sixth binary signals and said second binary information signals into said first RAM means;
said first logic means further includes means for transferring the second binary information signals from said first RAM means to said first microcontroller interface means, the fourth binary signal from said first RAM means to said first buffer/latch means, the fifth binary signal from said first RAM means to said second buffer/latch means, and the sixth binary signal from said second RAM means to said third buffer/latch means; and
said source means includes second controller means coupled to said first, second and third buffer/latch means and said first microcontroller interface means, said second controller means being responsive to said fourth, fifth and sixth binary signals and to said second binary information signals to control a second controlled device, whereby the fourth, fifth and sixth binary signals representing the Q, M and D bits are separately supplied from said first controller means and are transmitted through the ISDN, and the Q bit is recognized and used as an additional data bit by said second controller means for controlling a second controlled device.

5. A data transmission and remote control system as recited in claim 1 wherein
said first ISDN interface means further includes means for receiving 48 bit ISDN data frames from an ISDN and for extracting and outputting X.25 information packets including fourth, fifth and sixth binary signals and second binary information signals;
said second microcontroller interface means includes means for receiving said X.25 information packets and inserting said fourth, fifth and sixth binary signals and said second binary information signals into said first RAM means;
said first logic means further includes means for transferring the second binary information signals from said first RAM means to said first microcontroller interface means, the fourth binary signal from said first RAM means to said first buffer/latch means, the fifth binary signal from said first RAM means to said second buffer/latch means, and the sixth binary signal from said second RAM means to said third buffer/latch means; and
said source means includes second controller means coupled to said first, second and third buffer/latch means and said first microcontroller interface means, said second controller means being responsive to said fourth, fifth and sixth binary signals and to said second binary information signals and operative to control a controlled device, whereby the fourth, fifth and sixth binary signals representing the Q, M and D bits are received from an ISDN, and the Q bit is recognized and used as an additional data bit by said second controller means for controlling a second controlled device.

6. A data transmission and remote control system as recited in claim 5 wherein said first microcontroller interface means is a universal asynchronous receiver-transmitter for receiving and transmitting data in serial format.

7. A data transmission and remote control system as recited in claim 4 wherein said first microcontroller interface means and said fourth microcontroller interface means are universal asynchronous receiver-transmitters for receiving and transmitting data in serial format.

8. A data transmission and remote control system as recited in claim 4 wherein said first interface means is included in said second microcontroller interface means by time multiplexing between input to said first microcontroller means from said source means and alternately output from said first microcontroller means to said first ISDN interface means; and said fourth microcontroller interface means is included in said third microcontroller interface means by time multiplexing between input to said second microcontroller means from said second ISDN interface means and output from said second microcontroller means to said controller.

9. A data transmission and remote control system as recited in claim 5 wherein said first interface means is included in said second microcontroller interface means by time multiplexing between input to said first microcontroller means from said source means and alternately output from said first microcontroller means to said first ISDN interface means.

10. A data transmission and remote control system as recited in claim 4 wherein said first buffer/latch means includes an input buffer/latch means for an inputted first binary signal, and an output buffer/latch means for an outputted first binary signal;

said second buffer/latch means includes an input buffer/latch means for an inputted second binary signal, and an output buffer/latch means for an outputted second binary signal; and said third buffer/latch means includes an input buffer/latch means for an inputted third binary signal, and an output buffer/latch means for an outputted third binary signal.

11. A data transmission and remote control system as recited in claim 5 wherein said first buffer/latch means includes an input buffer/latch means for an inputted first binary signal, and an output buffer/latch means for an outputted first binary signal;

said second buffer/latch means includes an input buffer/latch means for an inputted second binary signal, and an output buffer/latch means for an outputted second binary signal; and said third buffer/latch means includes an input buffer/latch means for an inputted third binary signal, and an output buffer/latch means for an outputted third binary signal.

12. An improved microcontroller for receiving and assembling ISDN network data into standard X.25 information packets, including Q bits having particular positions in the packets, for D channel output to an ISDN interface, and for receiving D channel X.25 information packets and extracting and outputting the data, comprising:

Q bit processing means including first means for providing a separate Q terminal for receiving and sending a Q data bit;

second means for inserting the Q data bit received through said separate Q terminal in an X.25 information packet in a standard Q bit position; and third means for extracting the Q bit from the standard Q bit position in the X.25 information packet received by said transceiver from an ISDN network and for applying the Q bit to said separate Q terminal where it can be used as an extra data bit.

13. A transceiver for use in an ISDN communication system comprising:

first buffer/latch means providing input, output and latching of a first binary signal;

second buffer/latch means providing input, output and latching of a second binary signal;

third buffer/latch means providing input, output and latching of a third binary signal;

first microcontroller interface means providing input and output of binary information signals;

RAM means;

second microcontroller interface means for providing input and output of binary information signals to and from said transceiver;

logic means for transferring a first set of signals including said first, second and third binary signals inputted to and latched in said first, second and third buffer/latches, and first binary information signals inputted to said first microcontroller interface means to said RAM means for placement in a standard X.25 information packet according to X.25 protocol for transmission over an Integrated Services Digital Network, ISDN, with said first binary signal being placed in a standard Q bit position, said second binary signal being placed in a standard M bit position, said third binary signal placed in a standard D bit position, and said binary information signals being placed in standard information data positions, for transferring said first set of signals in an X.25 information packet from said RAM to said second microcontroller interface means for outputting said X.25 information packet, for transferring a second set of X.25 information packet signals inputted to said second microcontroller interface including a fourth binary signal of the standard Q bit, a fifth binary signal of the standard M bit, a sixth binary signal of the standard D bit, and second binary information signals, to said RAM means, for transferring said second binary information signals from said RAM to said first microcontroller interface means, for transferring said fourth binary signal from said RAM to said first buffer/latch means, for transferring said fifth binary signal from said RAM to said second buffer/latch means, for transferring said sixth binary signal from said RAM to said third buffer/latch means, whereby said transceiver is operative to receive said first set of signals, including operator selected Q, D and M bits from a source device and output them to an ISDN interface, and is operative to receive a second set of signals from an ISDN through an ISDN interface and output them to a controller for directing a controlled device, the Q bit being made available as an additional data bit.

14. A transceiver for use in an ISDN communication system comprising:

RAM means;

first microcontroller interface means providing input and output means for receiving and sending binary signals from and to a source means;

second microcontroller interface means for sending a first set of binary information signals, including first, second and third binary signals and first binary information signals in an X.25 information packet, and for receiving a second set of binary information signals, including a fourth binary signal of the standard Q bit, a fifth binary signal of the standard M bit, a sixth binary signal of the standard D bit, and second binary information signals, in an X.25 information packet; and logic means for transferring said first set of signals input to said first microcontroller interface means to said RAM means for placement in a standard X.25 information packet according to X.25 protocol for transmission over an Integrated Services Digital Network, with said first binary signal being placed in a standard Q bit position, said second binary signal being placed in a standard M bit position, said third binary signal placed in a standard D bit position, and said plurality of binary information signals being placed in standard information data positions, for transferring said first set of signals from said RAM to said second microcontroller interface means for output to an ISDN interface, for transferring said second set of signals input to said second microcontroller interface to said RAM means, and for transferring said second binary information signals and said fourth, fifth, and sixth binary signals from said RAM to said first microcontroller interface means, said transceiver being operative to receive said first set of signals, including operator selected Q, D and M bits, from a source device, and to output them to an ISDN interface, and being operative to receive a second set of signals from an ISDN through an ISDN interface and to output them to a controller for directing a controlled device, the Q bit being made available as an additional data bit.

* * * * *